United States Patent
Liu et al.

(10) Patent No.: US 10,664,363 B2
(45) Date of Patent: May 26, 2020

(54) AVAILABILITY OF A STORAGE SYSTEM

(71) Applicant: EMC IP Holding Company LLC, Hopkinton, MA (US)

(72) Inventors: Bing Liu, Tianjin (CN); Man Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 69 days.

(21) Appl. No.: 15/994,354

(22) Filed: May 31, 2018

(65) Prior Publication Data

US 2018/0349234 A1 Dec. 6, 2018

(30) Foreign Application Priority Data

Jun. 2, 2017 (CN) .......................... 2017 1 0409906

(51) Int. Cl.
| | |
|---|---|
| *G06F 12/00* | (2006.01) |
| *G06F 11/16* | (2006.01) |
| *G06F 3/06* | (2006.01) |
| *G06F 11/10* | (2006.01) |
| *G06F 11/30* | (2006.01) |
| *G06F 11/20* | (2006.01) |

(52) U.S. Cl.
CPC .......... *G06F 11/1662* (2013.01); *G06F 3/064* (2013.01); *G06F 3/065* (2013.01); *G06F 3/0617* (2013.01); *G06F 3/0653* (2013.01); *G06F 3/0659* (2013.01); *G06F 3/0689* (2013.01); *G06F 11/1076* (2013.01); *G06F 11/1088* (2013.01); *G06F 11/2058* (2013.01); *G06F 11/2069* (2013.01); *G06F 11/2087* (2013.01); *G06F 11/3034* (2013.01); *G06F 11/3055* (2013.01); *G06F 2201/86* (2013.01)

(58) Field of Classification Search
CPC ............. G06F 11/1662; G06F 11/1088; G06F 3/0617; G06F 3/065; G06F 3/0653; G06F 3/0659; G06F 3/0689; G06F 2201/86
See application file for complete search history.

(56) References Cited

U.S. PATENT DOCUMENTS

| | | | |
|---|---|---|---|
| 5,615,335 | A | 3/1997 | Onffroy et al. |
| 8,307,258 | B2 | 11/2012 | Flynn et al. |
| 8,839,028 | B1 * | 9/2014 | Polia .................. G06F 11/1084 |
| | | | 714/6.24 |
| 8,904,229 | B1 | 12/2014 | Veeraswamy et al. |
| 10,366,002 | B2 | 7/2019 | Atkisson et al. |

* cited by examiner

*Primary Examiner* — Shawn X Gu
(74) *Attorney, Agent, or Firm* — BainwoodHuang

(57) ABSTRACT

Embodiments of the present disclosure provide a method for a storage system, a storage system and a computer program product. The method comprises determining a first drive in a drive array is temporarily unavailable. The method further comprises setting the first drive in a frozen state. The method further comprises: in response to receiving a write request for the first drive during the frozen state, pending the write request or recording the write request in a second drive in the drive array. The method further comprises: in response to receiving a read request for the first drive during the frozen state, reconstructing data to which the read request is directed through data stored in a third drive in the drive array.

18 Claims, 9 Drawing Sheets

AVAILABILITY OF A STORAGE SYSTEM

RELATED APPLICATIONS

This application claim priority from Chinese Patent Application Number CN201710409906.2, filed on Jun. 2, 2017 at the State Intellectual Property Office, China, titled "IMPROVE AVAILABILITY OF A MEMORY SYSTEM" the contents of which is herein incorporated by reference in its entirety.

FIELD

Embodiments of the present disclosure relate to the field of data storage, and more specifically to a method for a storage system, a storage system and a computer program product.

BACKGROUND

Enterprises, organizations or government departments and the like usually need an enterprise-level storage system to store various data. In order to avoid potential risks of the enterprises, organizations or government departments, the enterprise-level storage system need have a high availability to minimize downtime of the storage system. In a production environment, the downtime is generally caused by the following two cases. One case is that the system is offline so that the system cannot work completely. For example, during the maintenance window, software or device's firmware is updated to fix some known issue. The other case is that the system is temporarily stuck and is in an unserviceable state, during which, the system or some of its components show a significant performance degradation, which can only provide very bad user experience. Both cases are unacceptable to the business system and need to be prevented as possible.

RAID (Redundant Array of Independent Disks) is usually considered as a good method for the drive level's high availability. RAID combines multiple physical drives into a single logic unit to help improve the availability of a storage system. Yet, the traditional RAID technique and its optimization do not work very well in the production environment, and cannot well support virtual storage and distributed storage applications. Some industry products can solve some issues of RAID, yet from the high level view, they do not have a generic design for different types of drives' high availability.

SUMMARY

Embodiments of the present disclosure provide a solution for improving availability of a storage system.

According to a first aspect of the present disclosure, there is provided a method for a storage system including a drive array. The method comprises determining a first drive in the drive array is temporarily unavailable. The method further comprises setting the first drive in a frozen state. The method further comprises: in response to receiving a write request for the first drive during the frozen state, suspending the write request or recording the write request in a second drive in the drive array. The method further comprises: in response to receiving a read request for the first drive during the frozen state, reconstructing data to which the read request is directed through data stored in a third drive in the drive array.

According to a second aspect of the present disclosure, there is provided a storage system. The storage system comprises a drive array and a controller. The controller is configured to determine that a first drive in the drive array is temporarily unavailable. The controller is further configured to set the first drive in a frozen state. The controller is further configured to, in response to receiving a write request for the first drive during the frozen state, suspend the write request or record the write request in a second drive in the drive array. The controller is further configured to, in response to receiving a read request for the first drive during the frozen state, reconstruct data to which the read request is directed through data stored in a third drive in the drive array.

According to a third aspect of the present disclosure, there is provided a computer program product. The computer program product is tangibly stored on a non-transitory computer readable medium and includes machine-executable instructions. The machine-executable instructions, when executed, enables the machine to implement any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objects, features, advantages of example embodiments of the present disclosure will become more apparent. In the drawings, identical or similar reference numbers represent the same or similar elements, in which.

DETAILED DESCRIPTION OF EMBODIMENTS

Principles of the present disclosure will be described below with reference to several example embodiments shown in the figures. Although figures show preferred embodiments of the present disclosure, it should be appreciated that these embodiments are described only to enable those skilled in the art to better understand and thereby implement the present disclosure, not to limit the scope of the present disclosure in any manner.

Figure 1:
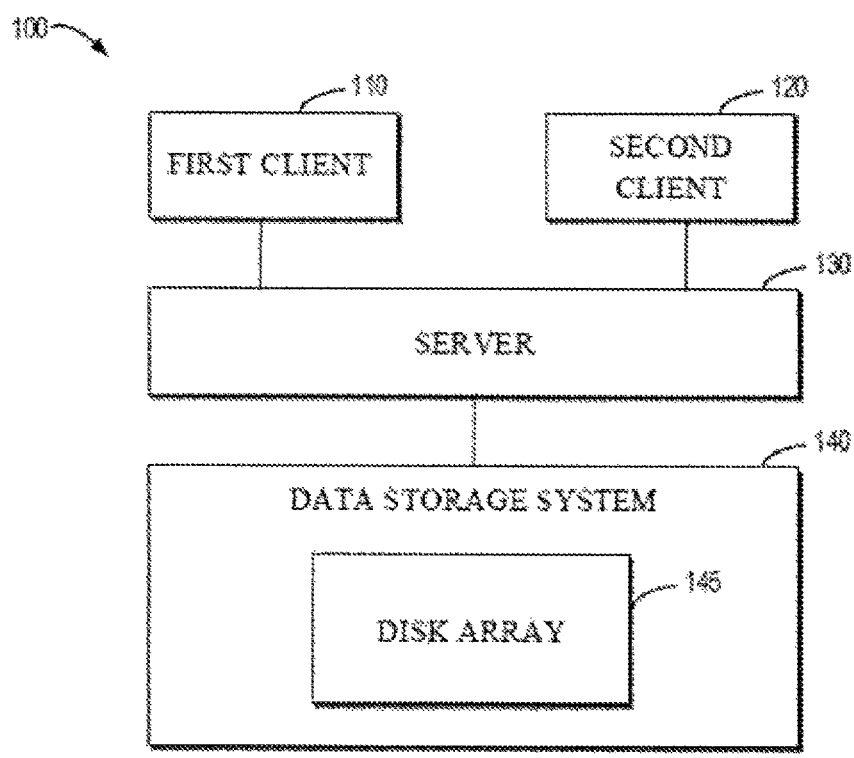
FIG. 1 illustrates a schematic diagram of a conventional data storage environment including a data storage system.

FIG. 1 illustrates a schematic diagram of a conventional data storage environment 100 including a data storage system. As shown in FIG. 1, the environment 100 comprises a first client 100, a second client 120, a server 130 and a data storage system 140.

The first client 110 and the second client 120 may be user workstations connected to the server 130 via a network, for example, a desktop computer, a laptop computer, a tablet computer and a smart mobile phone. A client application, such as a webpage browser and an electronic mail client application, runs on the first client 110 and the second client 120 to cooperate with the server 130. A corresponding service program runs on the server 130 to provide the first client 110 and the second client 120 with the corresponding service such as database service, electronic mailing service and the like.

The data storage system 140 may provide storage support for the server 130. The data storage system 140 may comprise a disk array 145. The disk array 145 may be an array comprised of disks (sometimes also called drives). Commonly-used drives may usually include a conventional hard disk drive (HDD), a solid-state drive (SSD), a high-density drive (e.g., a shingled magnetic recording (SMR) drive), a virtual drive (virtual machine) in a client operating system (OS) and an Internet Small Computer System Interface (iSCSI) drive. As for these universal drives, implementation of high availability is confronted with many challenges described below.

Firmware of physical drive (e.g., HDD, SSD, SMR drive) upgrades with downtime. When it is needed to upgrade drives' firmware, users have to stop the business or even shutdown the system. Service can only be resumed after the maintenance time window.

Most of SSD and SMR drives have an internal garbage collection (GC) function in the drive firmware. For example, the garbage collection function of SSD is constantly moving valid pages to other blocks in order to reclaim more space. Yet such an operation costs very much, and during the garbage collection the performance of both SSD and SMR drive degrades badly.

In the Data Domain (DD) product, there is a "slow drive" phenomenon: at some time (usually under a high IO pressure), one drive temporarily (tens of seconds) becomes slow because of internal hardware errors or firmware defects. Since the backend storage is based on RAID, the performance of whole RAID degrades heavily due to such phenomenon of slow drive, finally resulting in an unexpected high IO latency.

A virtual drive and a distributed drive also have the temporary unavailable issue. Take a virtual drive as an example, its storage object has a special state named All Path Down (APD), in which all paths to the storage device are missing or the storage device is removed. This state is treated as transient, since the storage device might come back online. Regarding the distributed drive such as an iSCSI drive, it is often disturbed with the temporary network connection issue possible due to a sudden traffic spike, or some transient network issues.

A temporary issue of one drive (e.g., the above-mentioned garbage collection and slow drive) causes the whole system to present unacceptable performance degradation, and even cause the system not to respond to any user input. This case is very common in an actual production environment. On the other hand, in order to improve the virtualized and distributed storage system's availability, it is necessary to provide efficient solutions to solve the above-mentioned issues about the virtual drive and the iSCSI drive.

RAID is usually considered as a good method for the drive level's high availability, but the conventional RAID technology and its optimization seldom concerns the prevailing slow-drive phenomenon and therefore do not perform very well in the real production environment. Furthermore, the conventional RAID technology and its optimization also seldom concern APD issue of the virtual drive and the problem of the iSCSI drive, so they cannot support the virtual storage application and the distributed storage application.

Although some industrial products can solve issues existing in the conventional RAID and its optimization, but they do not have a generic design for different types of drives' high availability. For example, NetApp Data ONTAP can utilize RAID to support drive firmware upgrade without stopping business. But it does not take the issues of garbage collection, virtual drive, iSCSI drive into its high availability design. In short, their work seems more like a workaround, not a generic and extensible solution.

To at least partially solve the above issues and other potential problems, embodiments of the present disclosure provide a solution for improving availability of a storage system. This solution may be based on RAID. This solution introduces a special "frozen" state for a temporarily unavailable drive of a drive array. During the frozen state, as for a read request for reading data from a temporarily unavailable drive, the data which is requested by the read request and located on the temporarily unavailable drive may be reconstructed by other drives in the drive array. During the frozen state, as for a write request for writing data in the temporarily unavailable drive, the write request is suspended or recorded in other places (e.g., a spare drive in the drive array). After the frozen state, the write request recorded in other places will be synchronized to the recovered drive. The frozen state can be triggered in two ways: one is the online drive firmware upgrade process, and the other is the drive state monitor. The drive state monitor can collect drive related statistics and detect a slow drive, a garbage collection running, a temporary issue related to a virtual drive or a flaky iSCSI drive issue in a smart way.

The setting of the frozen state makes the storage system available during the whole frozen state. Furthermore, since the drive state monitor may detect issues of different types of drives, the solution provided by the embodiments of the present disclosure can be commonly used in different types of drives and have extensibility. The embodiments of the present disclosure are described in more detail with reference to FIG. 2 to FIG. 9.

Figure 2:
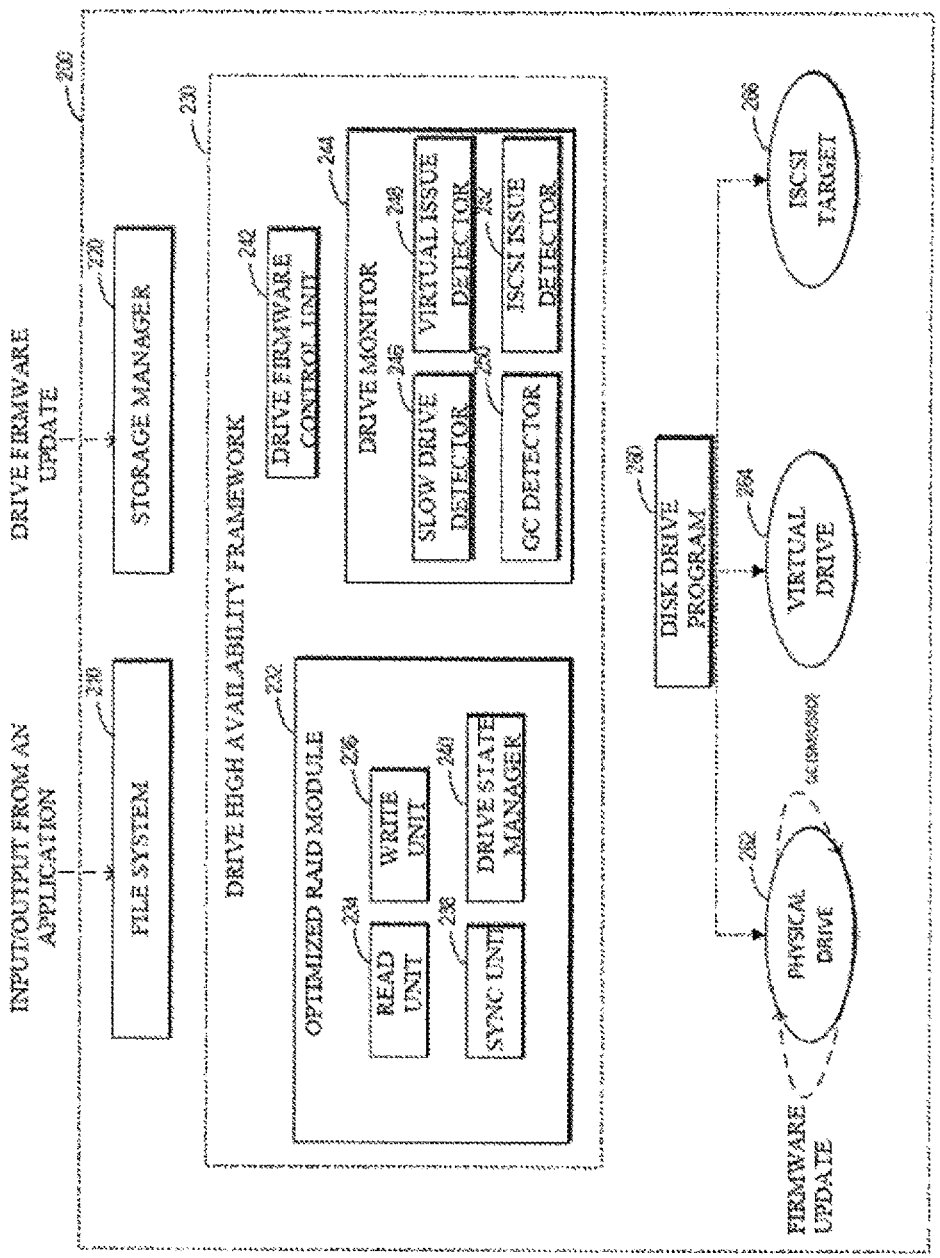
FIG. 2 illustrates a block diagram of a storage system according to an example embodiment of the present disclosure.

FIG. 2 illustrates a block diagram of a storage system 200 according to an example embodiment of the present disclosure. It should be appreciated that some components shown in FIG. 2 may be omitted, and furthermore, the storage system 200 in other embodiments may further include other components not shown here. That is to say, the block diagram shown in FIG. 2 is only to describe the embodiment of the present disclosure in an exemplary environment to help those skilled in the art to understand mechanisms and principles described here, is not intended to limit the scope of the present disclosure in any manner.

In the system shown in FIG. 2, besides the storage device (e.g., a physical drive 262, a virtual drive 264 and an iSCSI target 266) in the drive array (e.g., RAID), the storage system 200 may further comprise various software components and hardware components such as a file system 210, a storage manager 220, a drive high availability framework 230 and a disk drive program 260.

Regarding a data path, the file system 210 may receive, from an application, an input/output request and map the input/output request to an RAID layer on a bottom layer. It is desirable that the file system 210 does not recognize the temporary issue of any disk drive in the RAID. Being faced with the temporary issue of the drive, ensuring the high availability of the storage system 200 is a task of the drive high availability framework 230.

The storage manager 220 mainly works in a control path. For example, the storage manager 220 may work together with an RAID module to create an RAID device based on a disk group. Again for example, the storage manager 220 may be used to update the firmware of the disks on the bottom layer. Preferably, in response to the disks in the RAID starting the disk update process, the storage manager 220 may request a drive firmware control unit 242 to set the disk in the frozen state, and start the update process.

In the RAID, an input/output command is divided and re-mapped to a drive program 260 of each disk. The disk drive program 260 is used to perform translation of the input/output command and management and control related to a hardware registration.

The physical drive 262 means a drive such as a HDD, SSD and SMR drive on a physical platform. Firmware of one drive may be updated and re-activated by a SCSI command ("write buffer"). The update process usually finishes within several minutes, and may finish after a hard reset or restart. For drives like SSD or SMR drives, the function of garbage collection can run at some time based on its firmeware strategy.

The virtual drive 264 may represent a storage device in a hypervisor, and its format includes a virtual machine file system (VMFS), a network file system (NFS) or a raw device mapping (RDM). ISCSI target 266 is a target storage of iSCSI protocol, which is a type of distributed drive. At an initiating end, the iSCSI target 266 is output as an iSCSI drive.

The drive high availability framework 230 is used to ensure high availability of the storage system 200 in response to a certain drive in the drive array being temporarily unavailable. The drive high availability framework 230 comprises a drive firmware control unit 242, a drive monitor 244 and an optimized RAID module 232. The drive firmware control unit 242 serves as an interface of the framework 230 and is used to provide non-disruptive drive firmware update function.

The drive monitor 242 may collect statistic data from different types of drives such as HDD, SSD, SMR drive, virtual drive and iSCSI drive, and detect changes in the state of the drive in time, for example, the change of the drive from an available state to a temporarily unavailable state. The drive monitor 242 may comprise a slow drive detector 246, a virtual disk issue detector 248, a garbage collection detector 250, an iSCSI issue detector 252 and a detector for detecting temporary issues of other types of drives.

The slow drive detector 246 may, in response to an input/output latency of a certain drive in the drive array exceeding a threshold value, determine that the slow drive issue happens to the drive, thereby determining that the drive is temporarily unavailable. The Inventor finds that for the backend storage of data domain, IO patterns are very similar on each drive in the same RAID. For example, for healthy drives of the same RAID, it is impossible for the depths of their IO queues to vary significantly. With this finding, in some embodiments, it is possible to collect, in the case that each drive in the RAID is healthy, IO latency information (e.g., IO queue depth) of these healthy drives, and perform statistics analysis for the collected information to obtain distribution of IO latency of the drives in the RAID in a healthy case, for example, a mean value and a variance of IO latency of healthy drives. It is possible to, according to the obtained mean value and variance, calculate a threshold for determining whether the slow drive issue happens to a drive. In actual use, if the IO latency of one drive exceeds the threshold, it may be determined that the slow drive issue happens to the drive and the drive is temporarily unavailable. In some embodiments, the slow drive detector 246 may also use an error on the drive to detect the slow drive issue, thereby determining that the drive is temporarily unavailable.

The virtual drive issue detector 248 may determine that the virtual drive is temporarily unavailable, in response to all paths to the virtual drive getting missing or the virtual drive being removed. In some embodiments, the virtual disk issue detector 248 may run in the client OS to communicate with a special tool of the hypervisor to obtain a state of the virtual drive. The special tool may check whether the state of one datastore All Path Down, normal or Permanent Data Loss.

The garbage collection detector 250 may, in response to the SSD or SMR drive being performing the garbage collection procedure, determine that the SSD or SMR drive is temporarily unavailable. If the garbage collection function is running, the read/write latency of the SSD or SMR drive will have a peak. Therefore, in some embodiments, the garbage collection detector 250 may detect whether the garbage collection procedure happens by monitoring an average input/output latency. In addition, some drive manufactures will provide a specific interface to indicate that the garbage collection procedure is being performed. Hence, in some embodiments, the garbage collection detector 250 may also use this interface to know that the garbage collection procedure is being performed.

As far as the distributed drive such as the iSCSI drive, the iSCSI issue detector 252 may, in response to a network traffic burst, determine that the virtual drive is temporarily unavailable. In some embodiments, the iSCSI issue detector 252 may collect the network related statistics data to detect the network traffic burst, and the data may include packet loss rate, round-trip time (RTT) latency change, TCP congesting window size and throughput change and the like.

In addition, the drive monitor 244 may further comprise a detector for detecting whether other types of drives are temporarily unavailable. Since the drive monitor 244 can detect whether various drives including HDD, SSD, SMR drive, virtual drive and the distributed drive are temporarily unavailable, the solution provided by the embodiment of the present disclosure is universal for HDD, SSD, SMR drive, virtual drive and the distributed drive. In addition, regarding new types of drives that might appear in the future, a detector may be added to the drive monitor 244 to detect whether the new types of drives are temporarily unavailability, without adjusting other portions. Therefore, the solution according to the embodiment of the present disclosure can be easily extended. In addition, the drive monitor 244 can initiatively detect temporarily unavailable drives by using statistics of different types of drives.

An optimized RAID module 232 runs the core logic of the drive high availability framework 230. Besides the traditional RAID role, the optimized RAID module 232 can serve the incoming Read/Write requests for the temporarily unavailable drives, which greatly improves the availability of the whole storage system. The optimized RAID module 232 comprises a read unit 234, a write unit 236, a synchronization unit 238 and a drive state management unit 240.

The drive state management unit 240 manages a state of a drive in the drive array. The drive state management unit 240 may, in response to the drive monitor 244 detecting that a certain drive is temporarily unavailable, set the temporarily unavailable drive in a frozen state. The drive state management unit 240 may, in response to the temporarily unavailable drive becoming available, set the drive in a normal state. The drive state management unit 240 may, in response to timeout of the frozen state of the temporarily unavailable drive, set the drive in a failed state.

While a certain drive of the drive array is in the frozen state, regarding a read request for reading data from the frozen drive, the read unit 234 may read data from other drives in the drive array, and use the read data to reconstruct data requested by the read request through RAID reconstructing algorithm.

Regarding the write request for writing data to the frozen drive, the write unit 236 may use a limited memory buffer to suspend the write request, which is very useful for drive issues of very short time. If the number of write requests suspended in the memory buffer exceeds a predetermined threshold, the write unit 236 flushes all suspending write requests into a file, e.g., a log file, stored in a spare drive of the RAID. In some embodiments, the write unit 236 may write a data block to be written into the frozen drive by the drive request into the file. The write unit 236 maintains a synchronization indication associated with the froze drive whether the block on the frozen drive is to be synchronized in response to the frozen drive becoming available. For example, in an exemplary embodiment, a bitmap may be used to implement the synchronization indication. A bit in the bitmap corresponds to a block on the frozen drive, and a value of the bit indicates whether to synchronize the corresponding data block in the log file to the corresponding block of the drive, in response to the frozen drive becoming available. For example, if a certain bit in the bitmap is set as "1", this indicates that the block on the corresponding frozen drive corresponding to the bit is dirty, and the data should be synchronized in response to the frozen drive resuming available.

The synchronization unit 238 may request the frozen drive to start a synchronization process in response to a trigger event, and use the bitmap to copy the data block recorded on the spare drive to the drive. The trigger event may be the frozen drive becoming available, and for example include completion of drive FW update, completion of garbage collection, recovery of the virtual drive from the "APD" state or recovery from a slow drive to the health status. Specifically, if the value of a certain bit in the bitmap is "1", the synchronization unit 238 may copy the corresponding data block on the spare disk to a block on the drive corresponding to the bit.

Figure 3:
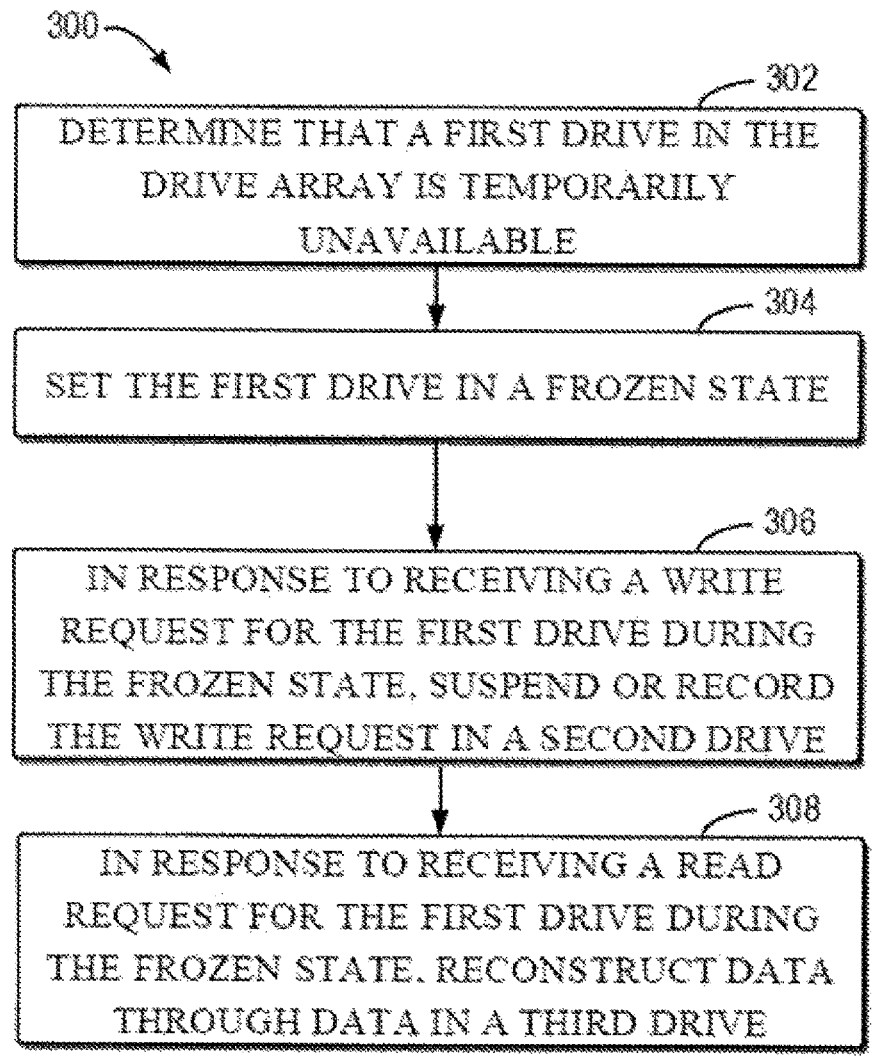
FIG. 3 illustrates a flow chart of a method for a storage system according to an example embodiment of the present disclosure.

Operations of the drive high availability framework 230 will be described in detail in conjunction with FIG. 3-FIG. 7. FIG. 3 illustrates a flow chart of a method 300 for a storage system according to an example embodiment of the present disclosure. The storage system may include a drive array. The drive array may be comprised of HDD, SSD, SMR drive, virtual drive or distributed drive.

At block 302, a first drive in the drive array is determined as being temporarily unavailable. In the embodiment of the present disclosure, "temporarily unavailable" means that the first drive is temporarily in an unserviceable state. It is possible to determine the first drive is temporarily unavailable by detecting a predetermined event. In some embodiments, the predetermined event may include the first drive starting an online firmware update process. The first drive may be determined as being temporarily unavailable in response to the first drive starting the online firmware update process.

In some embodiments, the predetermined event may include the first drive performing the garbage collection process. Specifically, it is feasible to judge that the first drive is performing the garbage collection process based on the input/output latency of the first drive exceeding a threshold. The threshold may be predetermined by performing statistics analysis for input/output latency of the drives in the drive array in a normal case. Additionally or alternatively, it is also possible to acquire that the first drive is performing the garbage collection process based on the specific interface provided by a manufacturer of the first drive.

In some embodiments, the predetermined event may comprise the input/output latency of the first drive exceeding the threshold. The predetermined event may be used to detect the first drive become slower, namely, slow drive phenomenon appears. Specifically, the threshold may be predetermined by performing statistics analysis for input/output latency of the drives in the drive array in a normal case. The drive's input/output latency may be reflected by the drive's input/output queue depth. Therefore, the threshold may also be predetermined by performing statistics analysis for input/output queue depth when the drives in the drive array are in a normal case. Additionally or alternatively, the predetermined event may also include an error occurring on the first drive, namely, it is possible to determine the slow drive phenomenon occurs on the first drive based on occurrence of the error on the first drive.

In some embodiments, the predetermined event may include the first drive being removed or all paths to the first drive getting missing. Specifically, it is feasible to communicate with a special tool in a hypervisor of the virtual drive to know whether the virtual drive is in an All Path Down state, a normal state or a Permanent Data Loss state.

In some embodiments, the predetermined event may include a network traffic burst. Specifically, the network traffic burst may be detected by collecting network-related statistics data. The data may include packet loss rate, round-trip time latency change, TCP congesting window size and throughput change.

At block 304, the first drive is set in the frozen state. At block 306, in response to receiving a write request for the first drive during the frozen state, the write request is suspended or recorded in a second drive in the drive array. In some embodiments, the second drive is a spare drive in the drive array. At block 308, in response to receiving a read request for the first drive during the frozen state, data to which the read request is directed is reconstructed through data stored in a third drive (e.g., other drives other than the first drive and the spare drive) in the drive array.

In the embodiment of the present disclosure, the frozen state of the first drive may be triggered by an online firmware update process, or triggered by monitoring the state of the first drive. This takes into consideration the temporary unavailable issues (e.g., online firmware update, garbage collection impact, slow drive phenomenon and all paths getting missing) existing in various types of drives. Therefore, these embodiments provide a universal extensible solution to improve the availability of the storage system. The setting of the frozen state solves performance degradation caused by the temporary issues (e.g., the slow drive phenomenon, garbage collection issue, virtual drive issue or distributed drive issue), thereby making the performance of the storage system higher.

Figure 4:
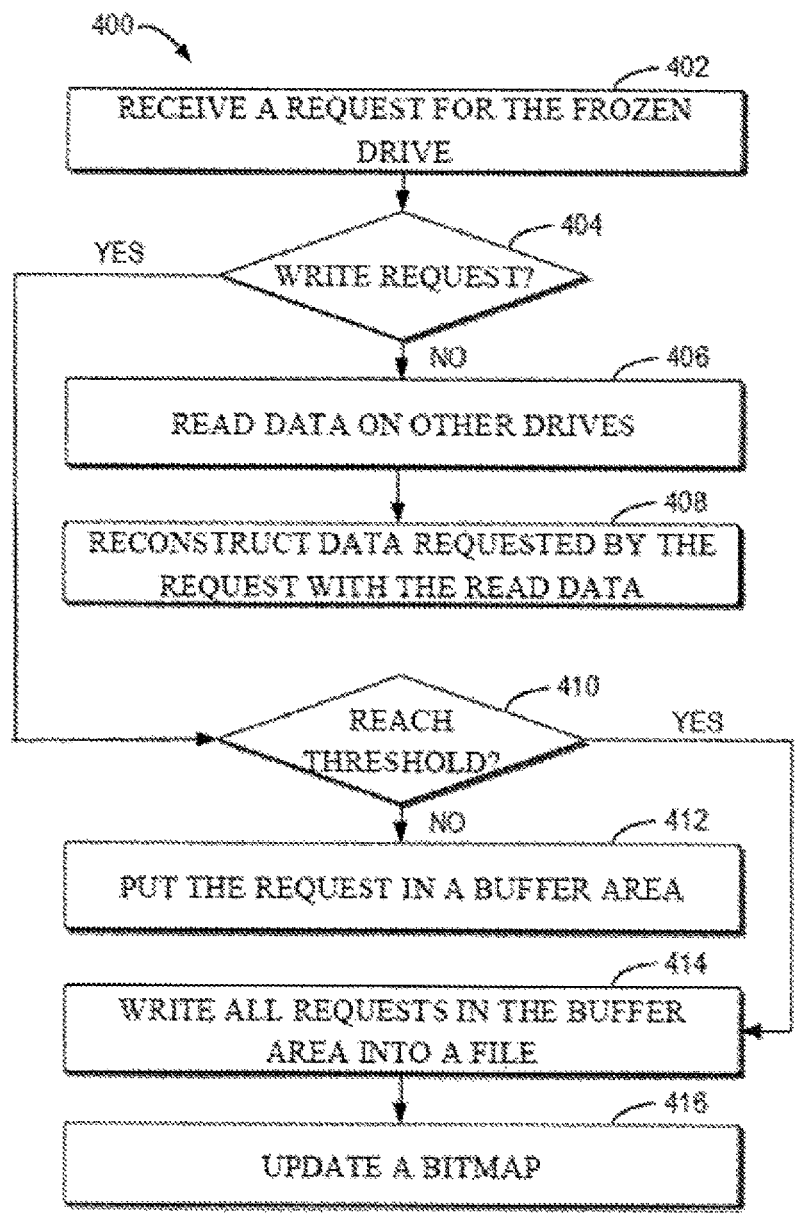
FIG. 4 illustrates a flow chart of a method of processing a read/write request for a frozen drive in a storage system according to an example embodiment of the present disclosure.

Reference is made below to FIG. 4 which illustrates a flow chart of a method 400 of processing a read/write request for a frozen drive in a storage system. The method 400 describes actions in blocks 306 and 308 of the method 300 shown in FIG. 3. The method may be executed by the read unit 234 and the write unit 236 in FIG. 2.

At block 402, a request for the first drive is received during the frozen state of the first drive. In some embodiments, the request may be a write request to write data to the first drive. The write request may include data to be written (namely, write data) and an address to be written to (namely, a write address). In some embodiments, the request may be a read request to read data from the first drive. The read request may include an address to be read from (namely, a read address).

At block 404, a determination is made as to whether the request is the read request or the write request. At block 408, in response the request being the write request, a determination is made as to whether the number of write requests that have queued up in a buffer area exceeds a threshold number. The buffer area may serve as a first in first out queue for storing suspending write requests. In response to the first drive becoming available, the suspending write requests in the buffer area may be executed in a sequential order of entering the queue. This type of limited buffer area is very useful for drive issues of very short time, and it can ensure executing, in response to the drive becoming available after the very short time, the write request for the drive within this very short time, thereby benefiting the performance of the storage system.

At block 410, in response to the number of write requests that have queued up in the buffer area not exceeding the threshold number, the request received at block 402 is placed in the buffer area and the number of write requests queuing up in the buffer area is updated.

At block 412, in response to the number of write requests that have queued up in the buffer area exceeding the threshold number, all requests in the buffer area are recorded to a file stored on a spare drive in the drive array. In some embodiments, it is possible to write a data block to be written into the first drive by each write request in the buffer area into the file.

At block 414, a synchronization indication in the file associated with the first drive is updated. The synchronization indication indicates whether the block on the first drive is to be synchronized in response to the first drive becoming available. For example, in an exemplary embodiment, a bitmap may be used to implement the synchronization indication. Each bit in the bitmap corresponds to a block on the first drive. A value of the bit in the bitmap indicates whether the corresponding block on the first drive needs to be synchronized in response to the first drive becoming available. In some embodiments, updating the bitmap may include setting a value of a bit corresponding to the write address of each write request recorded in the file in the bitmap as "1", and setting other bits in the bitmap as "0".

At block 406, in response to the received request being a read request, data is read from a third drive (e.g., a drive other than the spare drive and the first drive) in the drive array. At block 408, the read data is used to reconstruct data requested by the read request. In some embodiments, the reconstruction may be performed through the RAID algorithm.

During temporary unavailability of the drive (namely, during the frozen state), regarding the read request, the requested data is reconstructed from other drives; regarding the write request, it is suspended or written into the spare drive. In this way, even though during temporary unavailability of a certain drive in the drive array, the whole storage system can still quickly respond to the user's input without presenting serious performance degradation, thereby providing a better user experience.

Figure 5:
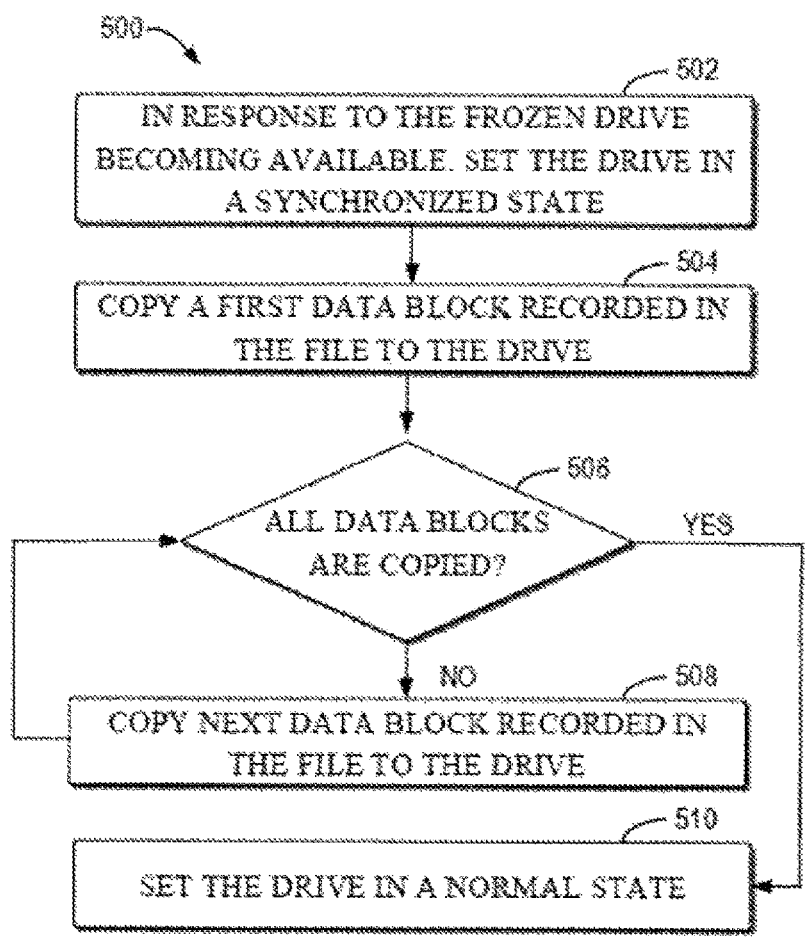
FIG. 5 illustrates a flow chart of a synchronization method for a storage system according to an example embodiment of the present disclosure.

FIG. 5 illustrates a flow chart of a synchronization method 500 for a storage system according to an example embodiment of the present disclosure. The method 500 may, in response to the frozen drive (for ease of description, the frozen drive in the depictions of the method 500 is called the first drive) becoming available, the synchronization indication described in the method 400 is used to synchronize the data block recorded in the file stored in the spare drive in the method 400 to the first drive.

At block 502, in response to the first drive becoming available, the first drive is set in a synchronized state to start a synchronization process. A trigger event of the synchronization process may include completion of drive firmware update, completion of garbage collection, recovery of the virtual drive from the "All Path Down" state, or recovery from a slow drive to the health status.

At block 504, the first data block in the file is copied to the first drive. Specifically, if a value of a bit corresponding to the first data block in the bitmap is "1", the first data block is copied to a corresponding block of the first drive.

At block 506, a determination is performed as to whether copying of all data blocks in the file is completed. At block 508, in response to the file including a data block not yet copied to the first drive, next data block in the file is copied to the first drive. Specifically, if a value of a bit corresponding to the data block in the bitmap is "1", the data block is copied to a corresponding block of the first drive. At block 510, the first drive is set in a normal state in response to copying of all data blocks in the file already being completed.

During the synchronization process, there might be a new write request mapped to the first drive. This case needs to be treated carefully. If the data to be written according to the new write request is written into the first drive first, subsequently the synchronization process copies old data recorded in the file to a write address of the new write request, then what is stored in the address is old data, which is not expected.

Figure 6:
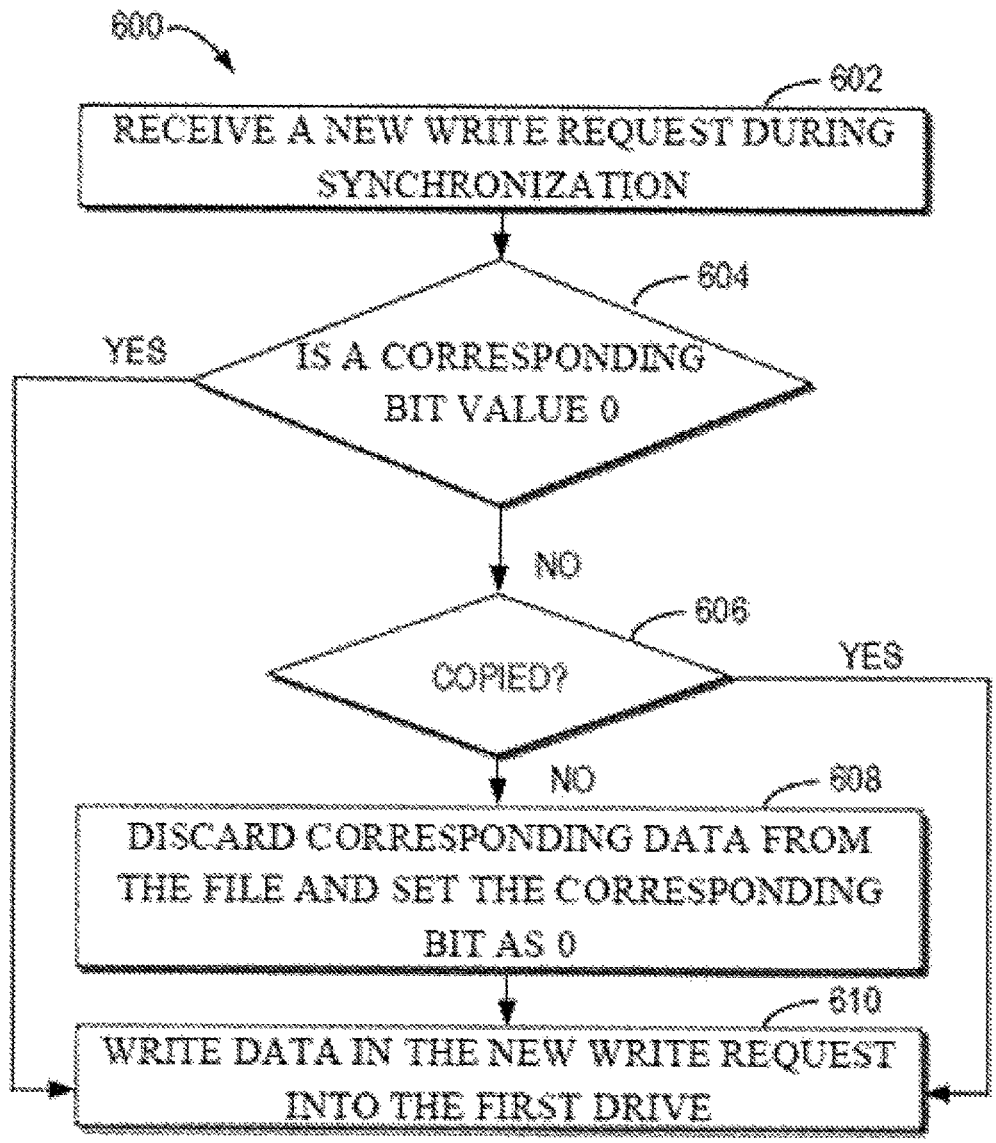
FIG. 6 illustrates a flow chart of a method of processing a new write request during synchronization according to an example embodiment of the present disclosure.

FIG. 6 illustrates a flow chart of a method 600 of processing a new write request during synchronization according to an example embodiment of the present disclosure. The method 600 describes how to process a new write request during execution of the synchronization method 500 shown in FIG. 5. The method may be executed by the synchronization unit 238 shown in FIG. 2.

At block 602, a new write request for the first drive is received while a synchronization process is performed for the first drive. The new write request includes to-be-written data and a write address. If the data to be written by the new write request is written into the first drive first, subsequently the synchronization process copies old data recorded in the file to a write address of the new write request, then what is stored in the address is old data. This case is not expected.

At block 604, a determination is performed as to whether a value of a bit in the bitmap corresponding to the write address of the new write request is 0. As stated above, if the value of the bit is 1 which indicates that the corresponding block is dirty, the block needs to be synchronized during synchronization, otherwise the block needn't be synchronized in the synchronization process. If at block 604 it is determined that the value of the bit in the bitmap corresponding to the write address of the new write request is 0, the method 600 proceeds to block 610, otherwise the method 600 proceeds to block 606.

At block 606, a determination is performed as to whether data which is recorded in the file of the spare drive and corresponds to the write address has already been copied to the first drive. If it is determined at block 606 that data which is recorded in the file of the spare drive and corresponds to the write address has already been copied to the first drive, the method 600 proceeds to block 610, otherwise the method 600 proceeds to block 608.

At block 608, the data which is recorded in the file of the spare drive and corresponds to the write address is discarded, and the value of the bit in the bitmap corresponding to the write address is set as 0. At block 610, data to be written by the new write request is written into a corresponding address of the first drive.

In method 600, if a certain data block on the spare drive is not copied to a corresponding address of the first drive and a request is received to write new data to the address, it can be ensured that the data written to the address is newest other than old data stored on the spare drive by setting the value of the corresponding bit in the bitmap as 0.

Figure 7:
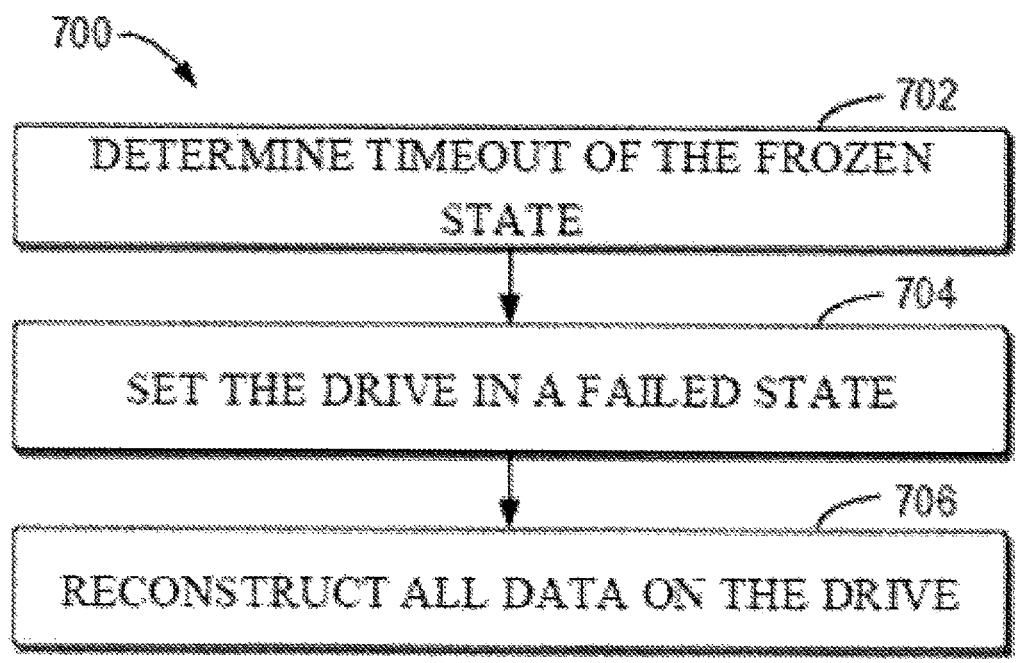
FIG. 7 illustrates a flow chart of a method of processing abnormity of a storage system according to an example embodiment of the present disclosure.

In the embodiment of the present disclosure, the frozen state is considered as a short process. If the frozen state cannot resume to a normal state in a limited time period, an abnormity processing procedure is activated. FIG. 7 illustrates a flow chart of an abnormity processing method 700 for a storage system according to an example embodiment of the present disclosure. The method 700 describes an abnormity processing procedure after timeout of the frozen state set in the method 300 shown in FIG. 3.

At block 702, timeout of the frozen state of the drive is determined. In some embodiments, it is possible to determine timeout of the frozen state of the drive in response to timeout of drive firmware update. In some embodiments, timeout of the frozen state of the drive may be determined in response to detecting data storage in an "All Path Down" state becomes a "Permanent Data Loss" state. In some embodiments, timeout of the frozen state of the drive may be determined in response to detecting that uncorrectable errors exist in the slow drive.

At block 704, the drive is set in a failed state. At block 706, all data stored on the drive are reconstructed. In some embodiments, it is possible to use a conventional RAID reconstruction algorithm to reconstruct all data stored on the drive, and store the reconstructed data on a spare disk.

Figure 8:
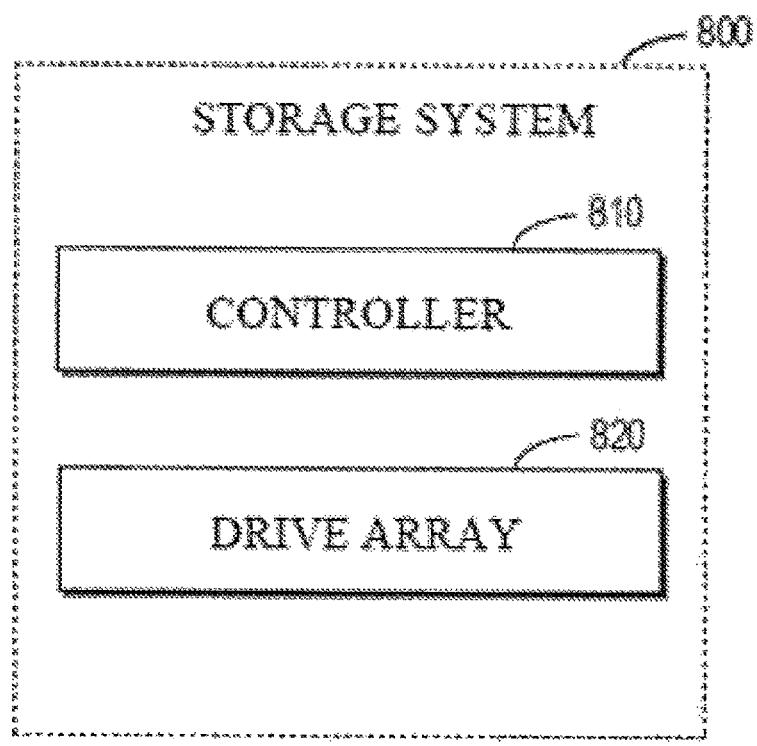
FIG. 8 illustrates a block diagram of a storage system according to an example embodiment of the present disclosure.

Reference is made below to FIG. 8 which illustrates a block diagram of a storage system 800 according to an example embodiment of the present disclosure. The storage system 800 may comprise a controller 810 and a drive array 820. The drive array 820 may be comprised of HDD, SSD, SMR drive, virtual drive or iSCSI drive.

The controller 810 may be configured to determine that a first drive in the drive array 820 is temporarily unavailable. In some embodiments, the controller 810 may determine that the first drive is temporarily unavailable by detecting a predetermined event. The predetermined event may include at least one of the following: the first drive starting a firmware update process, the first drive performing the garbage collection process, the first drive becoming slower (namely, a slow drive phenomenon appears), the first drive being removed, all paths to the first drive being missing, and a network traffic burst.

The controller 810 may be configured to set the first drive in a frozen state. The controller 810 may be configured to, in response to receiving a write request for the first drive during the frozen state, suspend or record the write request in a second drive in the drive array. The controller 810 may be configured to, in response to receiving a read request for the first drive during the frozen state, reconstruct data to which the read request is directed through data stored in a third drive in the drive array. In some embodiments, the second drive may be a spare drive in the drive array.

In some embodiments, the controller 810 may further be configured to: receive the read request for the first drive; read data stored in the third drive; and use the read data to reconstruct data to which the read request is directed.

In some embodiments, the controller 810 may further be configured to: receive the write request for the first drive; place the write request in a buffer area; in response to a number of write requests in the buffer area exceeding a threshold number, record data to be written by write requests in the buffer area in a file at the second drive; and update a synchronization indication associated with the first drive whether a block on the first drive is to be synchronized in response to the first drive becoming available. The synchronization indication may be implemented by a bitmap, a bit in the bitmap corresponds to a block on the first drive, and a value of the bit indicates whether the block is to be synchronized, in response to the first drive becoming available.

In some embodiments, the controller 810 may further be configured to, in response to the first drive becoming available, set the first drive in a synchronized state, and synchronize data recorded in the file to the first drive.

In some embodiments, the controller 810 may further be configured to: receive a new write request for the first drive during synchronization; in response to data in the file corresponding to a write address of a new write request being not yet synchronized to the first drive, discard the data in the file corresponding to the write address, set a value of a bit in the bitmap corresponding to a block corresponding to the write address as indicating that the block needn't be synchronized, and write data to be written by the new write request into the first drive.

In some embodiments, the controller 810 may further be configured to: in response to timeout of the frozen state, reconstruct all data stored on the first drive, and store the reconstructed data on a spare drive.

For clarity purpose, FIG. 8 does not show some optional modules of the storage system 800. However, it should be appreciated that features described above with reference to FIGS. 2-7 are also adapted for the storage system 800.

Figure 9:
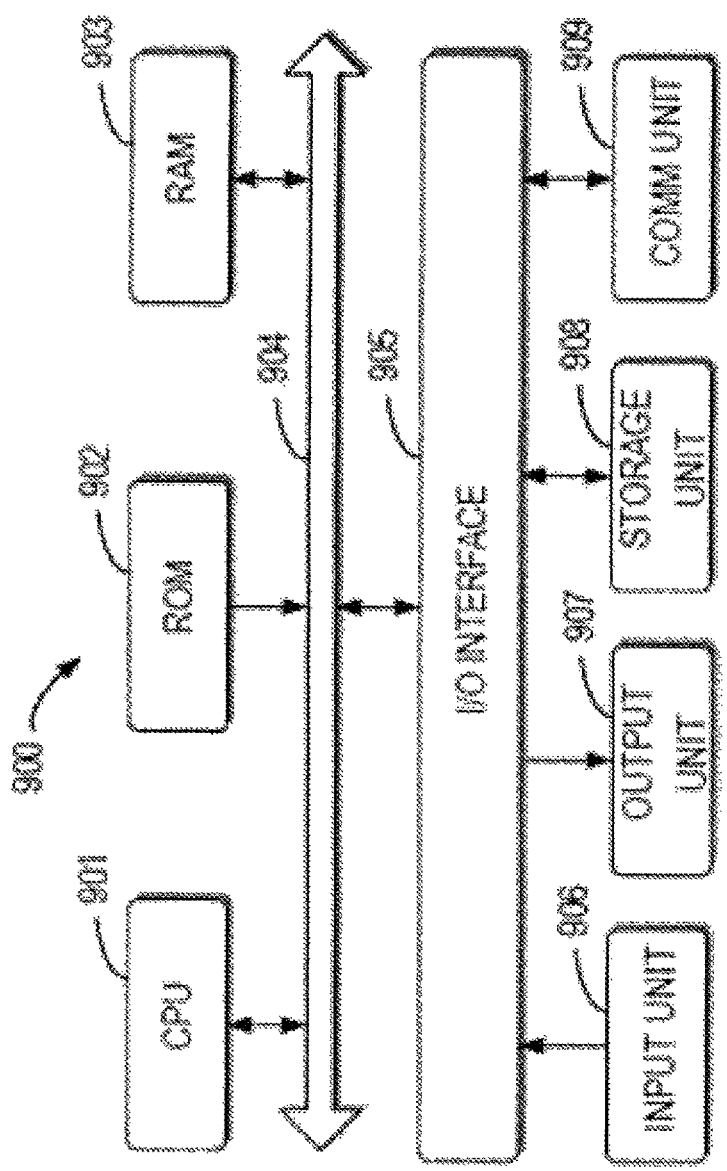
FIG. 9 illustrates a block diagram of an example apparatus used to implement the embodiments of the present disclosure.

FIG. 9 illustrates a block diagram of an example apparatus 900 used to implement the embodiments of the present disclosure. As depicted, the apparatus 900 comprises a central processing unit (CPU) 901 which is capable of performing various actions and processes in accordance with a computer program instruction stored in a read only memory (ROM) 902 or a computer program instruction loaded from a storage unit 908 to a random access memory (RAM) 903. In the RAM 903, various programs and data needed by operations of the apparatus 900 may be stored. The CPU 901, the ROM 902 and the RAM 903 are connected to one another via a bus 904. An input/output (I/O) interface 905 is also connected to the bus 904.

The following components in the apparatus 900 are connected to the I/O interface 905: an input unit 906 including a keyboard, a mouse, or the like; an output unit 907 for example various displays and loudspeakers; the storage unit 908 such as a magnetic disk or an optical disk;

a communication unit 909 such as a network card, a modem or a wireless communication transceiver. The communication unit 909 allows the apparatus 900 to exchange information/data with other devices via for example an Internet computer network and/or various telecommunication networks.

The procedures and processes described above, for example methods 300-700, may be executed by the processing unit 901. For example, in some embodiments, methods 300-700 may be implemented as a computer software program which is tangibly included in a machine-readable media such as a storage unit 908. In some embodiments, part or all of the computer program may be loaded and/or installed on the apparatus 900 via a ROM 902 and/or a communication unit 909. When the computer program is loaded to RAM 903 and executed by CPU 901, one or more steps of methods 300-700 descried above may be performed. Alternatively, in other embodiments, the CPU 901 may be configured to implement the above methods 300-700 in any other proper manners.

Those skilled in the art should appreciate that the above steps of the present disclosure may be implemented by using a general-purpose computing device, they may be integrated on a single computing device, or distributed on a network comprised of a plurality of computing devices. Optionally, they may be implemented by using computing device-executable program codes so that they may be stored in a storage device and executed by the computing device, or they are respectively fabricated into respective integrated circuit modules, or multiple modules or steps therein are implemented in a way of being fabricated into a single integrated circuit module. As such, the present disclosure is not limited to any specific combination of hardware and software.

It should be noted that although a plurality of means or sub-means of the device have been mentioned in the above detailed depiction, such partitioning is merely non-compulsory. In actuality, according to the embodiments of the present disclosure, the features and functions of the above described two or more means may be embodied in one means. In turn, the features and functions of the above described one means may be further embodied in more modules.

What are described above are only preferred embodiments of the present disclosure and not intended to limit the present disclosure. Those skilled in the art appreciate that the present disclosure may have diverse modifications and variations. Any modifications, equivalent substitutions and improvements made within the spirit and principle of the present disclosure all fall within the protection scope of the present disclosure.

We claim:

1. A method for a storage system including a drive array, the method comprising:
   determining that a first drive in the drive array is temporarily unavailable;
   setting the first drive in a frozen state;
   in response to receiving a write request for the first drive during the frozen state, putting the write request in a buffer area;
   in response to receiving a read request for the first drive during the frozen state, reconstructing data to which the read request is directed through data stored in a third drive in the drive array;
   in response to a number of write requests in the buffer area exceeding a threshold number, recording data to be written by the write requests in the buffer area into a file stored in a second drive; and
   updating a synchronization indication associated with the first drive whether a block on the first drive is to be synchronized in response to the first drive becoming available.

2. The method according to claim 1, wherein determining that the first drive is temporarily unavailable comprises:
   determining that the first drive is temporarily unavailable by detecting a predetermined event including at least one of the followings:
   the first drive starting an online firmware update process,
   the first drive being performing a garbage collection process,
   input/output latency of the first drive exceeding a threshold,
   an error occurring on the first drive,
   the first drive being removed,
   all paths to the first drive being missing, and
   a network traffic burst.

3. The method according to claim 1, wherein reconstructing the data to which the read request is directed includes:
   in response to receiving the read request during the frozen state, reading data stored in the third drive; and
   reconstructing the data to which the read request is directed with the read data.

4. The method according to claim 1, further comprising:
   in response to the first drive becoming available,
   setting the first drive in a synchronized state; and
   synchronizing data recorded in the file to the first drive.

5. The method according to claim 4, further comprising:
   in response to receiving a second write request for the first drive during the synchronization, determining whether target data in the file corresponding to an address to which the second write request is directed has been synchronized to the first drive;
   in response to determining that the target data has not been synchronized to the first drive,
   discarding the target data;
   setting the synchronization indication that a block corresponding to the address to which the second write request is directed needn't be synchronized; and
   writing the target data into the first drive.

6. The method according to claim 1, further comprising:
   in response to timeout of the frozen state, reconstructing data stored in the first drive.

7. A storage system, comprising:
   a drive array; and
   a controller configured to:
      determine that a first drive in the drive array is temporarily unavailable; and
      set the first drive in a frozen state;
      in response to receiving a write request for the first drive during the frozen state, put the write request in a buffer area;
      in response to receiving a read request for the first drive during the frozen state, reconstruct data to which the read request is directed through data stored in a third drive in the drive array;
      in response to a number of write requests in the buffer area exceeding a threshold number, record data to be written by write requests in the buffer area in a file stored in a second drive; and
      update a synchronization indication associated with the first drive whether a block on the first drive is to be synchronized in response to the first drive becoming available.

8. The storage system according to claim 7, wherein the controller is configured to determine that the first drive is temporarily unavailable by detecting a predetermined event including at least one of the followings:
the first drive starting an online firmware update process,
the first drive being performing a garbage collection process,
input/output latency of the first drive exceeding a threshold,
an error occurring on the first drive,
the first drive being removed,
all paths to the first drive being missing, and
a network traffic burst.

9. The storage system according to claim 7, wherein the controller, when reconstructing the data to which the read request is directed, is configured to:
in response to receiving the read request during the frozen state,
read data stored in the third drive; and
reconstruct the data to which the read request is directed with the read data.

10. The storage system according to claim 7, wherein the controller is further configured to:
in response to the first drive becoming available,
set the first drive in a synchronized state; and
synchronize data recorded in the file to the first drive.

11. The storage system according to claim 10, wherein the controller is further configured to:
in response to receiving a second write request for the first drive during the synchronization, determine whether target data in the file corresponding to an address to which the second write request is directed has been synchronized to the first drive;
in response to determining that the target data has not been synchronized to the first drive,
discard the target data;
set the synchronization indication that a block corresponding to the address to which the second write request is directed needn't be synchronized; and
write the target data to the first drive.

12. The storage system according to claim 7, wherein the controller is further configured to:
in response to timeout of the frozen state, reconstruct data stored in the first drive.

13. A computer program product for a storage system including a drive array, the computer program product comprising:
a non-transitory computer readable medium encoded with computer-executable code, the code configured for the execution of:
determining that a first drive in the drive array is temporarily unavailable;
setting the first drive in a frozen state;
in response to receiving a write request for the first drive during the frozen state, putting the write request in a buffer area;
in response to receiving a read request for the first drive during the frozen state, reconstructing data to which the read request is directed through data stored in a third drive in the drive array;
in response to a number of write requests in the buffer area exceeding a threshold number, recording data to be written by the write requests in the buffer area into a file stored in a second drive; and
updating a synchronization indication associated with the first drive whether a block on the first drive is to be synchronized in response to the first drive becoming available.

14. The computer program product of claim 13, wherein determining that the first drive is temporarily unavailable comprises:
determining that the first drive is temporarily unavailable by detecting a predetermined event including at least one of the followings:
the first drive starting an online firmware update process,
the first drive being performing a garbage collection process,
input/output latency of the first drive exceeding a threshold,
an error occurring on the first drive,
the first drive being removed,
all paths to the first drive being missing, and
a network traffic burst.

15. The computer program product of claim 13, wherein reconstructing the data to which the read request is directed includes:
in response to receiving the read request during the frozen state, reading data stored in the third drive; and
reconstructing the data to which the read request is directed with the read data.

16. The computer program product of claim 13, wherein the code is further configured for the execution of:
in response to the first drive becoming available,
setting the first drive in a synchronized state; and
synchronizing data recorded in the file to the first drive.

17. The computer program product of claim 16, wherein the code is further configured for the execution of:
in response to receiving a second write request for the first drive during the synchronization, determining whether target data in the file corresponding to an address to which the second write request is directed has been synchronized to the first drive;
in response to determining that the target data has not been synchronized to the first drive,
discarding the target data;
setting the synchronization indication that a block corresponding to the address to which the second write request is directed needn't be synchronized; and
writing the target data into the first drive.

18. The computer program product of claim 13 wherein the code is further configured for the execution of:
in response to timeout of the frozen state, reconstructing data stored in the first drive.

* * * * *